(12) United States Patent
Komiya

(10) Patent No.: US 7,493,750 B2
(45) Date of Patent: Feb. 24, 2009

(54) CABLE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/017,027

(22) Filed: Jan. 19, 2008

(65) Prior Publication Data

US 2008/0236131 A1   Oct. 2, 2008

(30) Foreign Application Priority Data

Mar. 29, 2007 (JP) ............................. 2007-089781

(51) Int. Cl.
*F16G 13/16* (2006.01)
(52) U.S. Cl. .............................. 59/78.1; 248/49; 248/51
(58) Field of Classification Search ................... 59/78.1, 59/900; 248/49, 51
See application file for complete search history.

(56) References Cited

U.S. PATENT DOCUMENTS

| | | | |
|---|---|---|---|
| 4,833,876 A | 5/1989 | Kitao et al. | |
| 4,885,908 A * | 12/1989 | Stohr | 59/78.1 |
| 5,014,506 A * | 5/1991 | Moritz | 59/78.1 |
| 5,163,281 A * | 11/1992 | Kanehira et al. | 59/78.1 |
| 5,220,779 A | 6/1993 | Tatsuta et al. | |
| 6,176,072 B1 * | 1/2001 | Weber | 59/78.1 |
| 6,864,425 B2 | 3/2005 | Ikeda et al. | |
| 6,925,795 B2 * | 8/2005 | Komiya | 59/78.1 |
| 6,984,782 B2 | 1/2006 | Ikeda et al. | |
| 7,013,630 B2 | 3/2006 | Komiya | |
| 7,040,081 B2 * | 5/2006 | Komiya | 59/78.1 |
| 7,047,720 B2 * | 5/2006 | Ikeda et al. | 59/78.1 |
| 7,119,273 B2 | 10/2006 | Komiya | |
| 7,176,375 B2 | 2/2007 | Utaki et al. | |
| 7,317,160 B2 | 1/2008 | Utaki | |
| 2004/0250526 A1 | 12/2004 | Ikeda et al. | |
| 2005/0252192 A1 | 11/2005 | Ikeda et al. | |
| 2006/0070764 A1 | 4/2006 | Utaki et al. | |
| 2007/0151225 A1 | 7/2007 | Ikeda et al. | |
| 2007/0163795 A1 | 7/2007 | Utaki et al. | |

FOREIGN PATENT DOCUMENTS

JP   2006-125494   5/2006

* cited by examiner

*Primary Examiner*—David B Jones
(74) *Attorney, Agent, or Firm*—Woodling, Krost and Rust

(57) ABSTRACT

A cable protection and guide device wherein the wear of the cable is suppressed. The detachment of the partitioning wall plate is simplified. Pairs of right and left link plates, flexional inner circumferential side plates, flexional outer circumferential side plates and partitioning wall plates form a link body. The flexional inner circumferential side plate includes an abutting flap and an inner circumferential side flap integral therewith. Inner locking groove is formed in the inner circumferential connecting plate over the width direction in a stepped manner. A hook shaped locking proximal portion of the partitioning wall plate interengages an inner locking groove. Flexional outer circumferential side plate includes an outer locking groove extended in the width direction of the cable accommodating space and locks a locking front end portion of the partitioning wall plate.

4 Claims, 4 Drawing Sheets

CABLE PROTECTION AND GUIDE DEVICE

This application claims priority to Japanese Patent Application No. 2007-089781 filed Mar. 29, 2007.

TECHNICAL FIELD

The present invention relates to a cable protection and guide device. More specifically it relates to a cable protection and guide device suitable for accommodating a cable such as a cable (cables), a hose (hoses) or the like. The cable protection and guide device supplies a movable member of an industrial machine with electric power or energy of compressed air. The device safely and reliably guides and protects a cable (cables) or the like even when moving the movable portion.

BACKGROUND TECHNOLOGY

A cable or the like protection and guide device wherein a number of link frame bodies having rectangularly-shaped sections is known. A flexional inner circumferential side connecting plate and a flexional outer circumferential side connecting plate are bridged over a pair of right and left link plates. The link frame bodies are connected to each other to form a cable or the like accommodating space which accommodates and disposes a cable or the like to protect and guide it. A partitioning wall plate partitions the cable in the cable accommodating space and is laterally detachably provided between the flexional inner circumferential side connecting plate and the flexional outer circumferential side connecting plate. Pawl portions of these partitioning wall plate members are attached while front and rear portions of the inner circumferential side connecting plate and the outer circumferential side connecting plate are held. See, Patent Reference 1 is Japanese Laid-Open Patent Publication No. 2006-125494.

PROBLEMS TO BE SOLVED BY THE INVENTION

However, in the above-mentioned conventional cable protection and guide device both longitudinal edges of a flexional inner circumferential side connecting plate and a cable are excessively brought into contact with each other every time the cable protection and guide device is flexed. Excessive wear of the cable occurs and wear powder is produced. Thus a method for reducing the wear of the cable is necessary.

Further, in the conventional cable or the like protection and guide device, partitioning wall plate members are attached to the flexional inner circumferential side connecting plate and the flexional outer circumferential side connecting plate in a holding manner. After fitting of pawl portions of the partitioning wall plate members to the flexional inner circumferential side connecting plate and the flexional outer circumferential side connecting plate, a problem occurs in that considerable work is necessary in disassembling the cable protection and guide device for maintenance or repair.

Accordingly, an object of the present invention is to solve the above-mentioned conventional problem. Accordingly it is an object to provide a cable protection and guide device in which wear of the cable with respect to both longitudinal edges of a flexional inner circumferential side connecting plate is suppressed. Accordingly it is an object of the present invention to prevent generation of wear powder and wear damage of the cable. Accordingly, it is an object of the present invention to simplify the removal of the partitioning wall plate.

MEANS FOR SOLVING THE PROBLEMS

The present invention has solved the above-mentioned problem. Specifically, a cable protection and guide device includes a plurality of link frame bodies of rectangular cross-section. Each link frame body includes a flexional inner circumferential side connecting plate and a flexional outer circumferential side connecting plate bridged over a pair of right and left link plates. The link bodies are connected to each other to form a cable or the like accommodating space. The cable accommodating space accommodates a cable or the like to protect and guide it. A partitioning wall plate partitions the cable in the cable accommodating space. The partitioning wall plate is laterally detachably provided between the flexional inner circumferential side connecting plate and the flexional outer circumferential side connecting plate. The flexional inner circumferential side connecting plate includes an abutting flap which abuts and supports the cable. An inner circumferential side flap is integrally molded in a flexional inner circumferential side and overlaps a subsequent abutting flap during flexion. An inner locking groove is formed between the abutting flap and the inner circumferential side flap over a width direction of the cable accommodating space in a stepped manner. A hook shaped locking proximal portion of the partitioning wall plate is inserted from the longitudinal direction of the cable or the like accommodating space to be locked. The flexional outer circumferential side connecting plate includes an outer locking groove extended in the width direction of the cable accommodating space. The locking groove locks a locking front end portion of the partitioning wall plate with the movement in a longitudinal direction of the cable accommodating space restricted.

The present invention has further solved the above-mentioned problem through use of an abutting flap of the flexional inner circumferential side connecting plate. The abutting flap includes a bent surface in the longitudinal direction which is used as the flexional inner circumferential side flexes.

The present invention has further solved the above-mentioned problem by using supporting protruded pieces which hold (secure) the partitioning wall plate in its standing (upright) position. The hook-shaped locking proximal portion includes supporting protruded pieces on both sides of the partitioning wall plate in the width direction.

EFFECTS OF THE INVENTION

According to the present invention a number of link frame bodies of rectangular section are interconnected together. Each of the links includes a flexional inner circumferential side connecting plate and a flexional outer circumferential side connecting plate bridged over a pair of right and left link plates. The link frame bodies are connected to each other to form a cable or the like accommodating space which accommodates and disposes a cable or the like to protect and guide it. A partitioning wall plate partitions the cable or the like in the cable or the like accommodating space. The portioning wall plate is laterally detachably provided between the flexional inner circumferential side connecting plate and the flexional outer circumferential side connecting plate. A cable (cables) or the like is accommodated and disposed in the cable or the like accommodating space and can be flexibly guided and protected. Additionally the following peculiar effects can be obtained.

The flexional inner circumferential side connecting plate includes an abutting flap which abuts (engages) the cable. An inner circumferential side flap is integrally molded in a flexional inner circumferential side. The abutting flap overlaps a subsequent inner circumferential side flap during flexion. An inner locking groove is formed between the abutting flap and the inner circumferential side flap over a width direction of the cable accommodating space in a stepped manner. The flexional outer circumferential side connecting plate includes an outer locking groove extended in the width direction of the cable or the like accommodating space. Insertion of the partitioning wall plate into or removal from the inner locking groove of the flexional inner circumferential side connecting plate in a longitudinal direction of the cable or the like accommodating space allows easy detachable operation (i.e. disassembly) of the partitioning wall plate. Assembly and disassembly of the cable or the like protection and guide device is simplified.

Further, the inner locking groove of the flexional inner circumferential side connecting plate supports the hook-shaped proximal portion of the partitioning wall plate during the operation of the cable or the like protection and guide device while at the same time an outer locking groove of the flexional outer circumferential side connecting plate restricts the movement of a locking front end portion in the longitudinal direction. As such, a fall, a positional shift or the like of the partitioning wall plate in the longitudinal direction can be reliably prevented.

According to the cable or the like protection and guide device of the present invention the abutting flap of the flexional inner circumferential side connecting plate includes the same longitudinal bent surface as the flexional inner circumferential side flap in transferring the cable or the like to a flexed state or condition. When the cable or the like protection and guide device is flexed, a cable (cables) or the like comes into contact with a bent surface of each flexional inner circumferential side connecting plate in the longitudinal direction without excessively coming into contact with both edges of each flexional inner circumferential side connecting plate in the longitudinal direction. Thus the contact area is increased so that the contact surface pressure can be reduced. As a result the wear of the cable or the like is suppressed and the generation of wear powder and wear damage of the cable or the like can be avoided.

According to the cable or the like protection and guide device, supporting protruded pieces are respectively provided on both sides of the hook shaped locking proximal portion of the partitioning wall plate in the width direction of the hook-shaped locking proximal portion. Supporting protruded pieces prevent the fall of the partitioning wall plate and support in its standing (upright) position. Thus during operation of the cable or the like protection and guide device, even if a load is applied on the partitioning wall plate by the cable or the like, the partitioning wall plate does not fall and the partitioning function is maintained. The fall of the partitioning wall plate is prevented at the time of assembling the cable protection and guide device so that easy assembly occurs.

A cable or the like protection and guide device includes a plurality of link frame bodies of a rectangular cross-section. Each of the link plates includes a flexional inner circumferential side connecting plate and a flexional outer circumferential side connecting plate bridged over a pair of right and left link plates. The link frame bodies are connected to each other to form a cable or the like accommodating space which accommodates and disposes a cable or the like to protect and guide it. A partitioning wall plate which partitions the cable or the like in the cable or the like accommodating space is laterally detachably provided between the flexional inner circumferential side connecting plate and the flexional outer circumferential side connecting plate. The flexional inner circumferential side connecting plate includes an abutting flap which abuts on the cable or the like. An inner circumferential side flap is integrally molded with the abutting flap. The abutting flap overlaps an inner circumferential side flap during flexion. An inner locking groove is formed between the abutting flap and the inner circumferential side flap over a width direction of the cable or the like accommodating space in a stepped manner. A hook shaped locking proximal portion of the partitioning wall plate is inserted from the longitudinal direction of the cable or the like accommodating space so as to lock the partitioning plate in place. The flexional outer circumferential side connecting plate includes an outer locking groove extended in the width direction of the cable or the like accommodating space and in which a locking front end portion of the partitioning wall plate is locked in the longitudinal direction of the cable. The wear of the cable (cables) or the like with respect to both edges of the flexional inner circumferential side connecting plate in the longitudinal direction is suppressed. The generation of wear powder and wear damage of the cable is prevented. The detachable operation (i.e. removal) of the partitioning wall plates is easily made so that assembly and disassembly is easy.

In the link frame body adopted in the cable or the like protection and guide device according to the present invention, a flexional inner circumferential side correcting plate and a flexional outer circumferential side connecting plate are respectively bridged over a pair of right and left link plates. The link frame body has a rectangular cross-section and as such any link frame body may be used if the structure as described herein is incorporated. The link frame body may be formed by any molding technique such as integral molding or separate molding.

Further, the flexional inner circumferential side connecting plate, the flexional outer circumferential side connecting plate, the partitioning wall plate and the like used in the cable or the like protection and guide device of the present invention may use any materials if the materials have the fatigue resistance and the impact resistance. When a glass fiber reinforced polyamide resin is used it exhibits excellent fatigue resistance to repeated flexion and impact resistance. Therefore the glass fiber reinforced polyamide resin is preferable.

DESCRIPTION OF THE INVENTION

Example

A cable or the like protection and guide device 100, which is an example according to the present invention, will be described with reference to drawings below.

Figure 1:
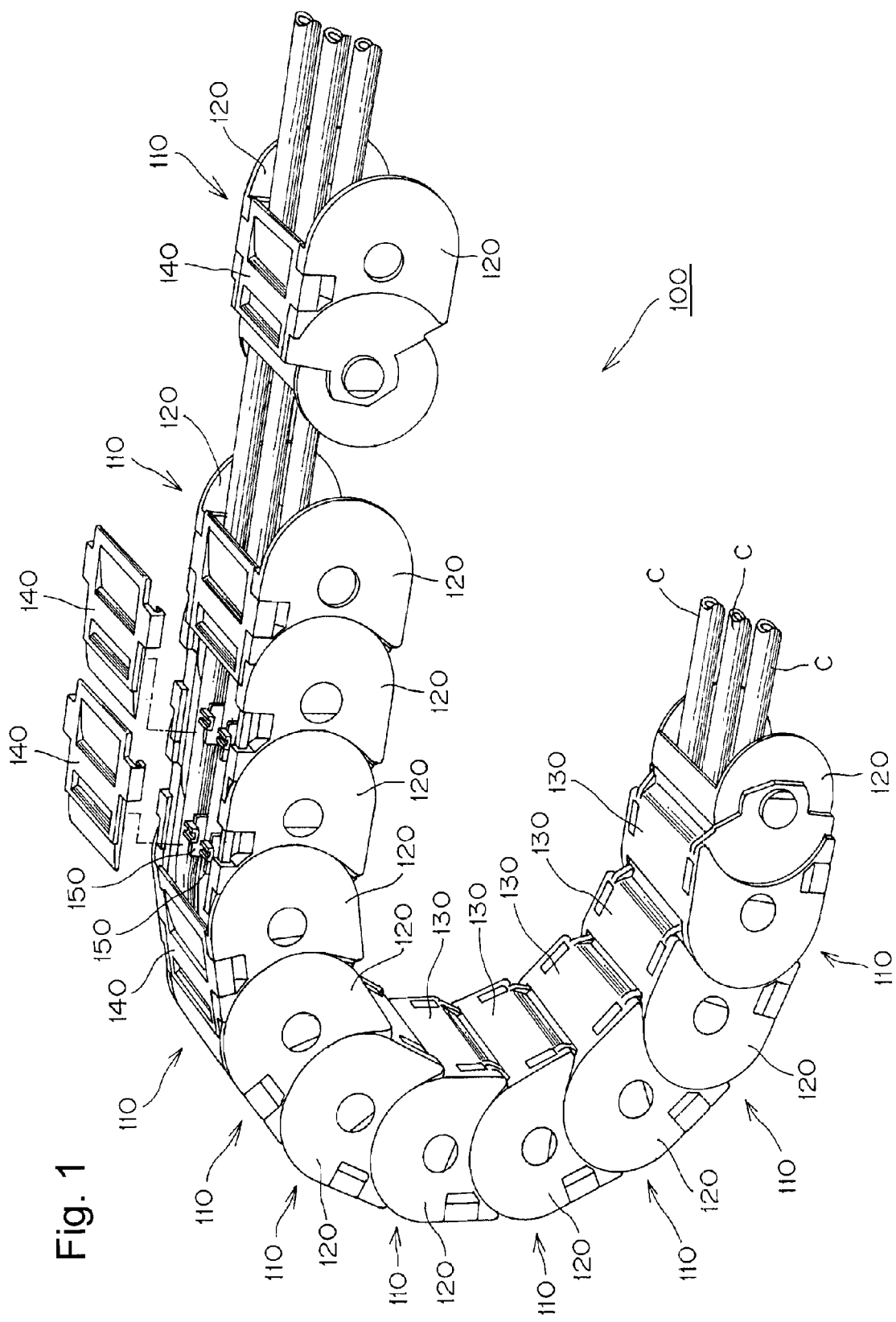
FIG. 1 is a whole schematic view of a cable or the like protection and guide device, which is an example according to the present invention.
Figure 2:
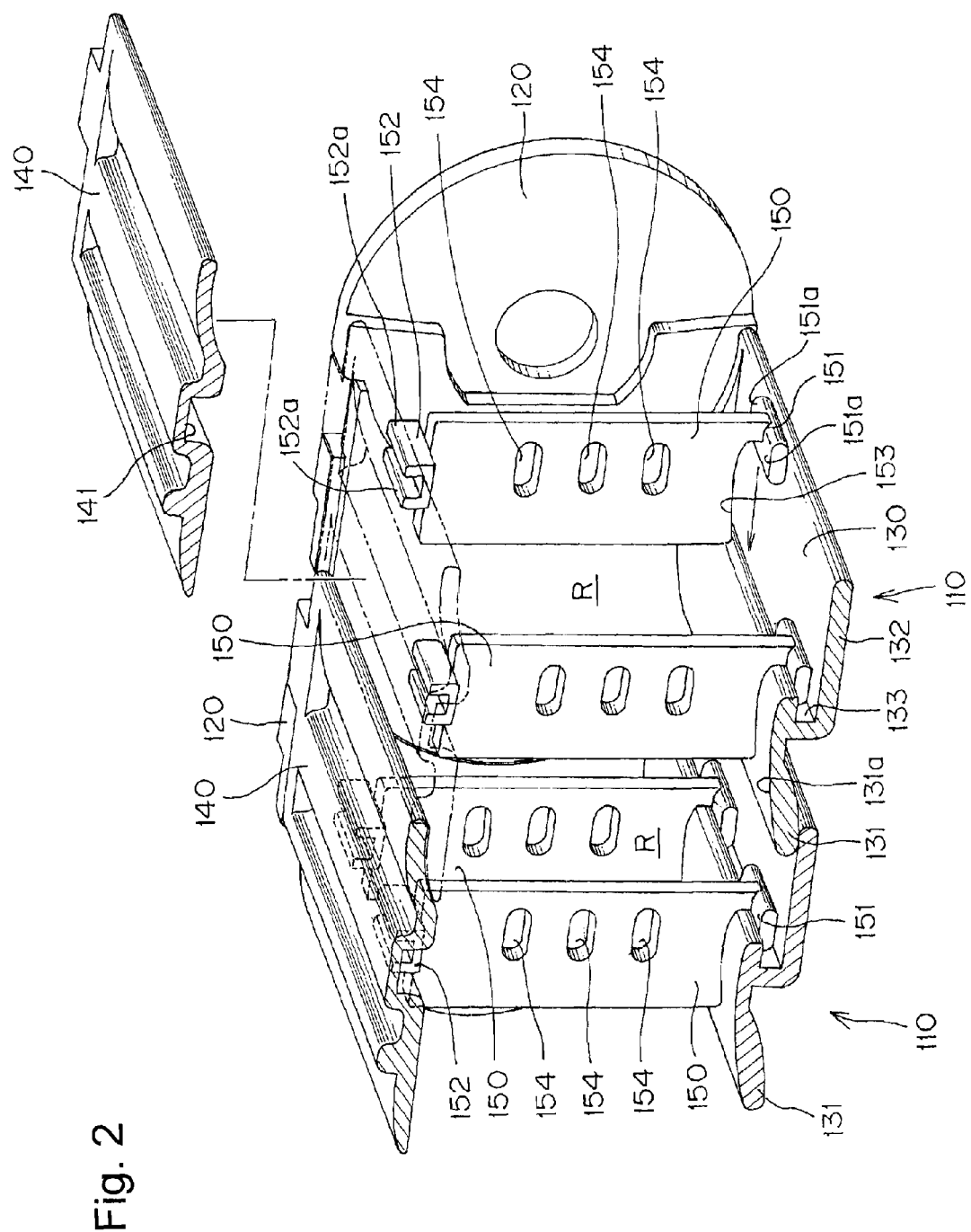
FIG. 2 is a perspective view showing a link frame bodies-connected state.
Figure 3:
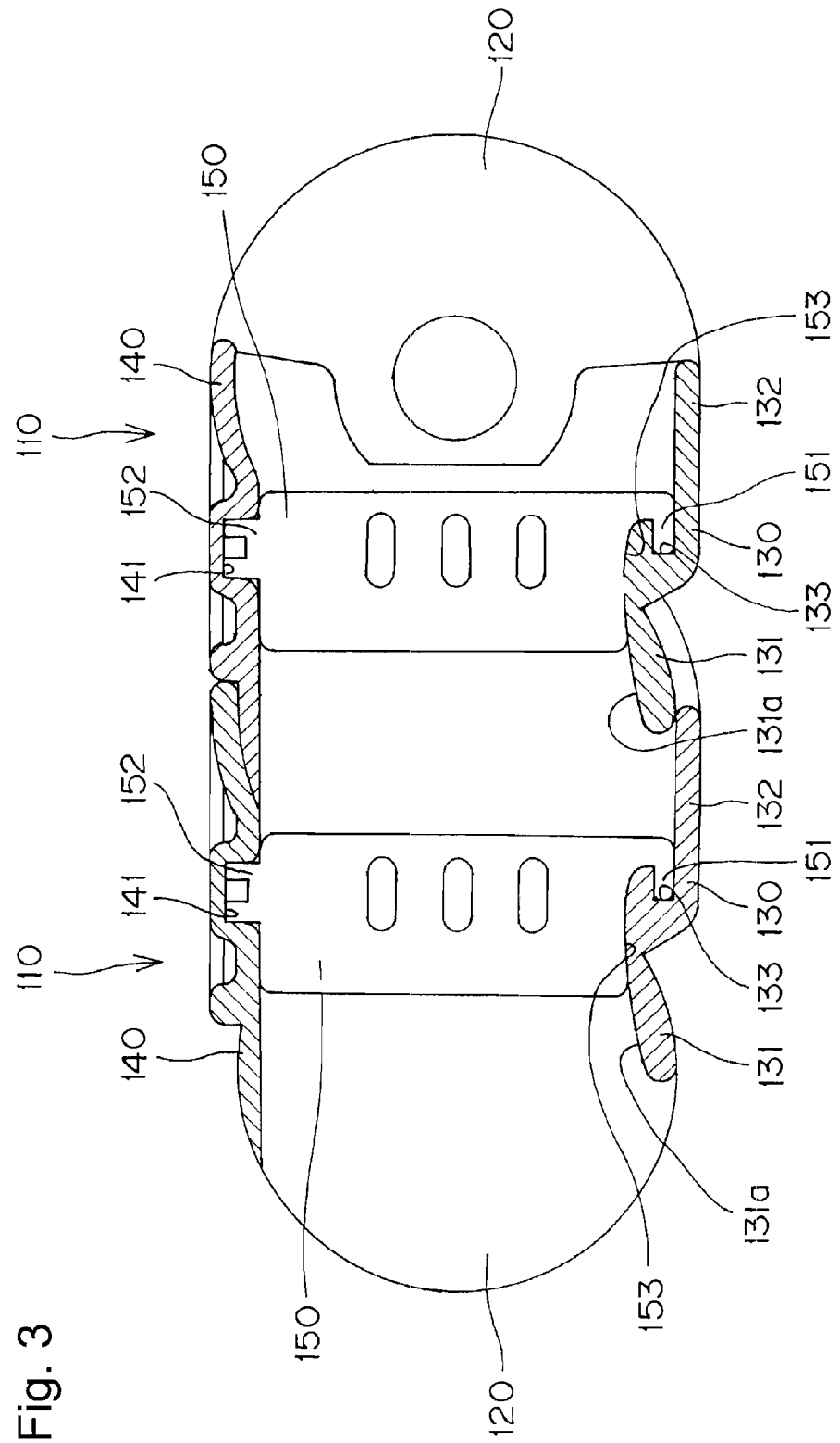
FIG. 3 is a cross-sectional view showing a link frame bodies-connected state.
Figure 4:
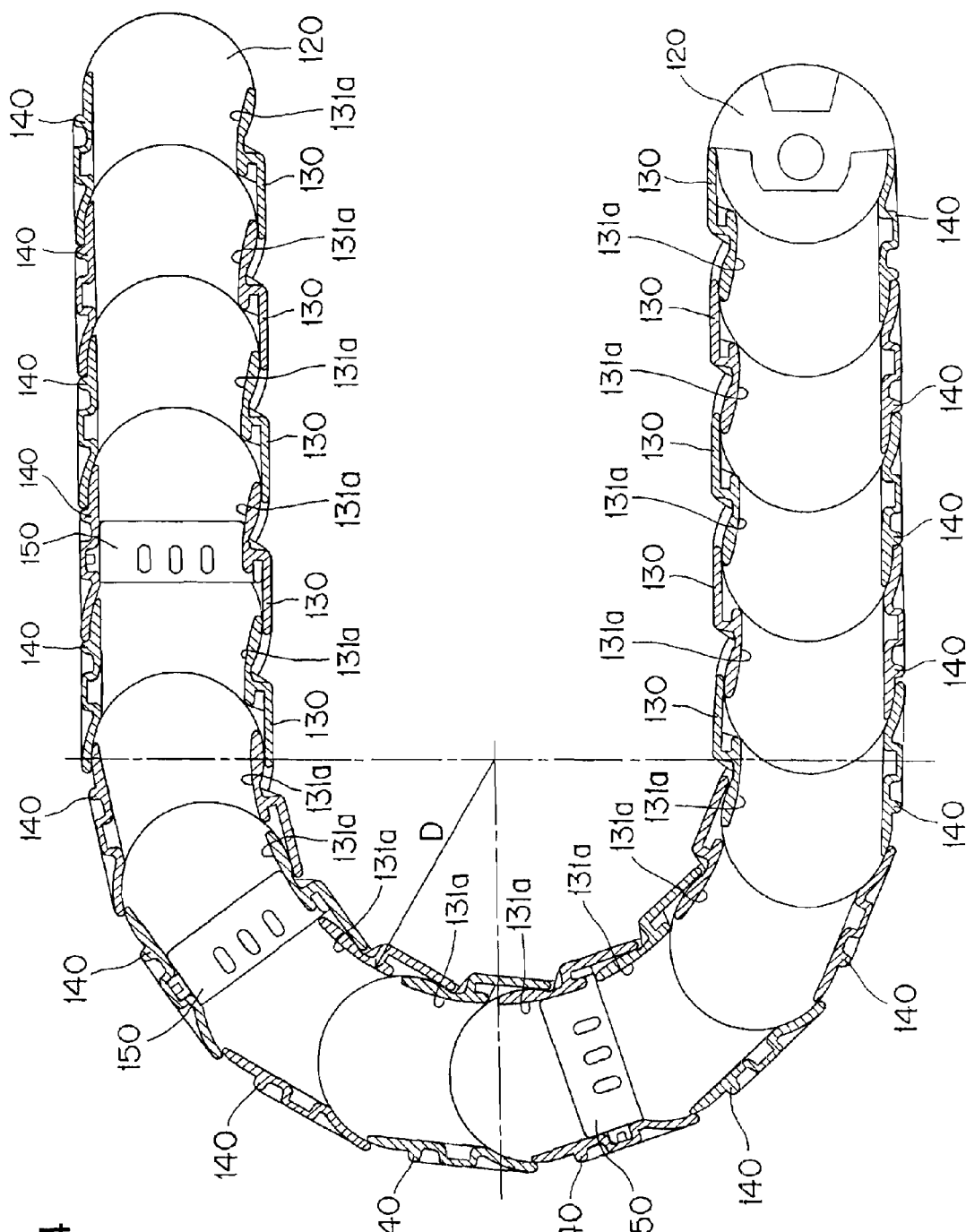
FIG. 4 is a whole cross-sectional view of a cable or the like protection and guide device according to the present invention.

Here, FIG. 1 is a whole schematic view of a cable or the like protection and guide device, which is an example according to the present invention. FIG. 2 is a perspective view showing the link frame bodies in the connected state. FIG. 3 is a cross-sectional view showing the link frame bodies in the connected state. FIG. 4 is a whole cross-sectional view of a cable or the like protection and guide device.

First, a cable or the like protection and guide device 100 which is an example of the present invention is used for protecting and guiding cable (cables) or the like such as electric cables for transmitting electric signals which connect between a movable section and a stationary section of a semiconductor chip mounter, a machine tool, a vehicle or the like. The device may also supply electric power or hoses (which supply oil pressure or pneumatic pressure). As shown in FIG. 1, the cable or the like protection and guide device 100 includes link frame bodies 110 each having a rectangular frame cross-section. The link frame bodies have front and rear ends flexibly connected to rear and front ends of adjacent link frame bodies 110 respectively. An end of a number of connected link frame bodies in a longitudinal direction is attached to a movable machine (not shown) and the other end thereof is attached to a floor surface (not shown).

The link frame body 110 comprises, as shown in FIGS. 1 to 3, a pair of right and left link plates 120, a flexional inner circumferential side connecting plate 130 integrally bridged over the flexional inner circumferential side of the pair of right and left link plates 120, 120, and, a flexional outer circumferential side connecting plate 140 bridged over the flexional outer circumferential side of the pair of right and left link plates 120, 120. The link frame body further includes a partitioning wall plate 150 detachably provided between the flexional inner circumferential side connecting plate 130 and the flexional outer circumferential side connecting plate 140. Partitioning wall plate 150 laterally partitions a cable or the like accommodating space R formed by surrounding it with the pair of right and left link plates 120, 120, the flexional inner circumferential side connecting plate 130 and the flexional outer circumferential side connecting plate 140.

The flexional inner circumferential side connecting plate 130, the flexional outer circumferential side connecting plate 140 and the partitioning wall plate 150, will be described in detail with reference to FIGS. 1 to 4.

First, the flexional inner circumferential side connecting plate 130 includes, as shown in FIGS. 1 to 3, an abutting flap 131, which abuts on cables or the like C. An inner circumferential side flap 132 which is integrally molded in a flexional inner circumferential side with abutting flap 131 overlaps a subsequent abutting flap 131 during flexion. An inner locking groove 133 is formed between the abutting flap 131 and the inner circumferential side flap 132 over a width direction of the cable or the like accommodating space R in a stepped manner.

This inner locking groove 133 is provided so that a hook shaped locking proximal portion 151 of a partitioning wall plate 150 (to be described later) is inserted from the longitudinal direction of the cables or the like accommodating space R so as to lock the partitioning plate.

Further, the abutting flap 131 has, as shown in FIG. 4, the same bent surface 131a in the longitudinal direction as the flexional inner circumferential side flap at the time of bending the cables or the like C. Flexional radius D of the flexional inner circumferential side path at the time of transferring the cables or the like to a flexed state and the radius of curvature radius of the bent surface 131a in the longitudinal direction are the same.

The flexional outer circumferential side connecting plate 140 includes, as shown in FIGS. 1 to 3, an outer locking groove 141 extended in the width direction of the cable or the like accommodating space R. Outer locking groove 141 is provided for locking the front end portion 152 of the partitioning wall plate 150 (to be described later). Put another way, the movement in a longitudinal direction of the cable or the like accommodating space R is restricted.

The partitioning wall plate 150 is provided for laterally dividing the cable or the like accommodating space R as shown in FIGS. 1 to 3, and includes a hook shaped locking proximal portion 151. The hook shaped locking proximal portion 151 is inserted into the inner locking groove 133 of the flexional inner circumferential side connecting plate 130. A locking front end portion 152 is inserted into the outer locking groove 141 of the flexional outer circumferential side connecting plate 140.

The hook shaped locking proximal portion 151 provides supporting protruded pieces 151a, 151a on both sides of the partitioning wall in the width direction. Supporting protruded pieces 151a, 151a prevent the fall of the partitioning wall plate 150 in the width direction and holds the portioning wall in the standing position.

The locking front end portion 152 provides supporting protruded pieces 152a, 152a on both sides in the width direction. Supporting protruded pieces 152a, 152a prevent the fall of the partitioning wall plate 150 in the width direction and to hold its standing position.

Further, a flexional inner circumferential side edge portion 153 of the partitioning wall plate 150 abuts on the flexional inner circumferential side connecting plate 130 and is formed to be the same flexional inner circumferential side path (or contour) at the time of transferring the cables or the like C to a flexed state. As such, the side path (or contour) of the flexional inner circumferential side edge portion 153 conforms to the contour of the bent surface 131a of the above-mentioned flexional inner circumferential side connecting plate 130 in the longitudinal direction to the path (or contour) of the surface. The flexional inner circumferential side edge portion 153 of this partitioning wall plate 150 and the hook shaped locking proximal portion 151 reliably holds the edge portion of the flexional inner circumferential side connecting plate 130 in the longitudinal direction so that the fall of the partitioning wall plate 150 is prevented.

It is noted that the reference numeral 154 in FIGS. 1 to 3 denotes a shelf plate attachment hole for attaching a partitioning shelf plate member (not shown). The partition divides the cable or the like accommodating space R into a flexional inner circumferential side and a flexional outer circumferential side.

The cable or the like protection and guide device 100 of the present example includes the abutting flap 131 which abuts on the cables or the like C. The device also includes the inner circumferential side flap 132 integrally formed on a flexional inner circumferential side other than the abutting flap 131. The device also includes inner locking groove 133 formed between the abutting flap 131 and the inner circumferential side flap 132 in a width direction of the cable or the like accommodating space R in a stepped manner. And the flexional outer circumferential side connecting plate 140 includes the outer locking groove 141 extended in the width direction of the cable or the like accommodating space R.

Therefore, insertion or removal of the supporting protruded pieces of the partitioning wall plate 150 from the inner locking groove 133 of the flexional inner circumferential side connecting plate 130 in a longitudinal direction of the cable or the like accommodating space R is easy. Thus assembly and disassembly of the cable or the like protection and guide device 100 is easy. Further, the inner locking groove 133 of the flexional inner circumferential side connecting plate 130 supports the hook shaped proximal portion 151 of the partitioning wall plate 150 during operation of the cable protection and guide device 100 while at the same time an outer locking groove 141 of the flexional outer circumferential side connecting plate 140 restricts the movement of a locking front end portion 152 in the longitudinal direction. As such a fall, a position shift or the like of the partitioning wall plate 150 in the longitudinal direction can be reliably prevented.

The abutting flap 131 of the flexional inner circumferential side connecting plate 130 includes longitudinal bent surface 131a as a flexional inner circumferential side path in transferring the cable C to a flexed position.

Thus, when the cable protection and guide device 100 is flexed, cable C comes into contact with a bent surface 131a of each flexional inner circumferential side connecting plate 130 in the longitudinal direction without excessively coming into contact with both edges of each flexional inner circumferential side connecting plate 130 in the longitudinal direction. Thus the contact area is increased so that the contact surface pressure can be reduced. As a result the wear of the cables or the like C is suppressed and generation of wear powder and wear damage of the cable C can be avoided.

Supporting protruded pieces 151a, 151a are respectively provided on both sides of the hook shaped locking proximal portion 151 of the partitioning wall plate 150 in the width direction. Since these supporting protruded pieces 151a, 151a prevent the fall of the partitioning wall plate 150 allowing it to remain in its standing position, operation of the cable C protection and guide device 100 with a load from cables C acting on the partitioning wall plate 150 is possible. Under loaded conditions the partitioning wall plate 150 does not fall and the partitioning function for cables C is maintained. The fall of the partitioning wall plate 150 is prevented at the time of assembling of the cable protection and guide device 100 so that partitioning wall plate 150 mounting operation (i.e. assembly) can be easily and smoothly attained. Thus the effects of the example are very large.

DESCRIPTION OF REFERENCE NUMERALS

100 . . . Cable or the like protection and guide device
110 . . . Link frame body
120 . . . Link plate
130 . . . Flexional inner circumferential side connecting plate
131 . . . Abutting flap
131a . . . Bent surface in the longitudinal direction
132 . . . Inner circumferential side flap
133 . . . Inner locking groove
140 . . . Flexional outer circumferential side connecting plate
141 . . . Outer locking groove
150 . . . Partitioning wall plate
151 . . . Hook shaped locking proximal portion
151a . . . Supporting protruded piece
152 . . . Locking front end portion
152a . . . Supporting protruded piece
153 . . . Flexional inner circumferential side edge portion
154 . . . Shelf plate attachment hole
C . . . Cable (cables) or the like
R . . . Cable or the like accommodating space
D . . . Flexional radius of flexional inner circumferential side path The invention has been set forth by way of example only. Those skilled in the art will readily recognize that changes may be made to the invention without departing from the spirit and scope of the claims which follow hereinbelow.

The invention claimed is:

1. A cable protection and guide device, comprising:
a plurality of link frame bodies having a rectangular cross-section are articulately connected to each other in a longitudinal direction, each of said link frame bodies includes a pair of right and left link plates, enabling said link plates to form a flexional circumferential bend having a flexional inner circumferential side and flexional outer circumferential side;
each of said link plates includes a flexional inner circumferential side residing during bending on said flexional inner circumferential side of said bend;
each of said link plates includes an outer circumferential side residing during bending on said outer flexional circumferential side of said bend;
a flexional inner circumferential side connecting plate integrally bridged over said flexional inner circumferential sides of each of said pair of right and left link plates;
a flexional outer circumferential side connecting plate bridged over said flexional outer circumferential sides of each of said pair of right and left link plates;
said flexional outer circumferential side connecting plate includes an outer locking groove;
said outer locking groove transversely extends between said pair of right and left link plates;
a partitioning wall plate is detachably connected between said flexional inner circumferential side connecting plate and said flexional outer circumferential side connecting plate;
said partitioning wall plate includes a hook-shaped locking proximal portion;
said partitioning wall plate includes a locking front end portion;
a cable;
said link frame bodies are connected to each other, and together with said connecting plates and said partitioning wall plate form a cable accommodating space in which said cable resides;
said flexional inner circumferential side connecting plate includes an abutting flap which abuts said cable;
an inner circumferential side flap integrally molded with said abutting flap of said flexional inner circumferential side connecting plate;
said abutting flap of said flexional inner circumferential side connecting plate overlaps a subsequent inner circumferential side flap of a subsequent flexional inner circumferential side connecting plate;
an inner locking groove formed between said abutting flap and said inner circumferential side flap of said flexional inner circumferential side connecting plate;
said inner locking groove extending transversely between said pair of right and left link plates;
said hook shaped locking proximal portion of said partitioning wall plate is inserted and positioned transversely in said inner locking groove and locked against longitudinal movement;
said locking front end portion of said partitioning wall plate is inserted and positioned transversely in said outer locking groove of said outer circumferential side connecting plate and locked against longitudinal movement; and,
said partitioning wall plate transversely positionable in one of a plurality of positions between said pair of right and left link plates.

2. A cable protection and guide device according to claim 1 wherein said abutting flap of said flexional inner circumferential side connecting plate includes a longitudinal bent surface and said surface is used in transferring said cable to a flexed state.

3. A cable protection and guide device according to claim 1 wherein: said partitioning wall plate includes supporting protruded pieces; said supporting protruded pieces extend from both sides of said hook shaped locking proximal portion; said supporting protruded pieces are inserted in said inner locking groove and transversely positioned therein; and, said supporting protruded pieces maintain said partitioning wall plate in a standing position.

4. A cable protection and guide device according to claim 2 wherein: said partitioning wall plate includes supporting protruded pieces; said supporting protruded pieces extend from both sides of said hook shaped locking proximal portion; said supporting protruded pieces are inserted in said inner locking groove and transversely positioned therein; and, said supporting protruded pieces maintain said partitioning wall plate in a standing position.

* * * * *

UNITED STATES PATENT AND TRADEMARK OFFICE
CERTIFICATE OF CORRECTION

PATENT NO. : 7,493,750 B2
APPLICATION NO. : 12/017027
DATED : February 24, 2009
INVENTOR(S) : Shoichiro Komiya It is certified that error appears in the above-identified patent and that said Letters Patent is hereby corrected as shown below:

Col. 4, line 24, after "side" delete "correcting" and insert --connecting--.

Signed and Sealed this

Fourteenth Day of April, 2009

JOHN DOLL
*Acting Director of the United States Patent and Trademark Office*